United States Patent
Seddon et al.

(10) Patent No.: US 6,621,965 B2
(45) Date of Patent: Sep. 16, 2003

(54) OPTICAL FIBER CABLE WITH CONTROLLED HELIX-PLUS-EFL VALUES AND METHODS THEREFOR

(75) Inventors: David A. Seddon, Hickory, NC (US); William S. Jackman, Hickory, NC (US)

(73) Assignee: Corning Cable Systems LLC, Hickory, NC (US)

(*) Notice: Subject to any disclaimer, the term of this patent is extended or adjusted under 35 U.S.C. 154(b) by 0 days.

(21) Appl. No.: 10/107,424

(22) Filed: Mar. 27, 2002

(65) Prior Publication Data

US 2003/0118300 A1 Jun. 26, 2003

Related U.S. Application Data (63) Continuation-in-part of application No. 10/035,769, filed on Dec. 26, 2001.

(51) Int. Cl.[7] .................................................. G02B 6/44
(52) U.S. Cl. ...................................... 385/111; 385/104
(58) Field of Search ................................. 385/111, 112, 385/113, 109, 104, 108

(56) References Cited

U.S. PATENT DOCUMENTS

| | | | |
|---|---|---|---|
| 4,205,900 A | 6/1980 | Eve | 350/96.31 |
| 4,478,488 A | 10/1984 | Bagley | 350/96.23 |
| 4,921,413 A | 5/1990 | Blew | 425/71 |
| 4,983,333 A | 1/1991 | Blew | 264/1.5 |
| 5,015,063 A | 5/1991 | Panuska et al. | 350/96.23 |
| 5,125,063 A | 6/1992 | Panuska et al. | 385/113 |
| 5,343,549 A * | 8/1994 | Nave et al. | 385/103 |
| 5,440,659 A | 8/1995 | Bergano et al. | 385/100 |
| 5,542,020 A | 7/1996 | Horska | 385/112 |
| 5,611,016 A | 3/1997 | Fangmann et al. | 385/100 |
| 5,930,431 A * | 7/1999 | Lail et al. | 385/100 |
| 6,052,502 A | 4/2000 | Coleman | 385/114 |
| 2001/0002943 A1 | 6/2001 | Nagayama et al. | 385/100 |
| 2001/0004415 A1 | 6/2001 | Tanaka et al. | 385/123 |
| 2001/0028773 A1 | 10/2001 | Kato et al. | 385/109 |

OTHER PUBLICATIONS

Gunther Mahlke and Peter Gossing, "Fiber Optic Cables", 3rd edition, 1997, pp. 115–127.
BICCCables "Electric Cables Handbook", Third edition, 1997, pp. 700–707.
Ando, "High–Resolution Reflectometer AQ7410".

* cited by examiner

Primary Examiner—Tulsidas Patel
(74) Attorney, Agent, or Firm—Michael E. Carroll, Jr.

(57) ABSTRACT

Fiber optic cables, and methods of manufacturing the same, include a plurality of carriers having at least one optical fiber therein. In one embodiment, the carriers are arranged in two layers within the cable and are generally disposed about a center area of the cable. Each layer has a respective helix-plus-EFL value. A difference between the respective helix-plus-EFL values of the layers defines a differential range being, preferably, about 1% or less. Additionally, the fiber optic cables can be used in fiber optic cable systems such as dispersion managed cable systems (DMCS).

40 Claims, 5 Drawing Sheets

OPTICAL FIBER CABLE WITH CONTROLLED HELIX-PLUS-EFL VALUES AND METHODS THEREFOR

CROSS-REFERENCE TO RELATED APPLICATIONS

The present application is a Continuation-In-Part of pending U.S. Appl. Ser. No. 10/035,769 filed Dec. 26, 2001, which is incorporated herein by reference.

TECHNICAL FIELD

The present inventions relate to the field of fiber optic cables, and, more particularly, to fiber optic cables having optical fibers with optical performance characteristics being managed for signal transmission performance of high data rate systems.

BACKGROUND OF THE INVENTION

Fiber optic cables are used to transmit telephone, television, and computer data information in indoor and outdoor environments in non-multiplexed and multiplexed optical transmission systems. In wave division multiplexed systems, optical performance characteristics play a significant role in maintaining high data rate transmission.

Optical attenuation, the loss in transmitted power, and chromatic dispersion, the differential transit time at adjacent wavelengths, are examples of optical performance characteristics in such transmission systems. Optical attenuation is typically due to absorption, scattering, and leakage of light from the optical waveguide and is customarily measured in a fiber, or cable, as a loss value in dB/km. Chromatic dispersion in fiber optic waveguides is the sum of material and waveguide dispersions and is generally measured as ps/(nm·Km). Differences in refractive index with respect to wavelength give rise to material dispersion. For silica-based glass used for optical fibers, material dispersion increases with wavelength through the commonly used communication range of about 0.9 $\mu$m to 1.6 $\mu$m. Material dispersion can have a negative or a positive sign depending on the wavelength.

Waveguide dispersion results from light traveling in both the core and cladding of an optical fiber. Waveguide dispersion is also a function of wavelength and the refractive index profile of the optical fiber. For example, a predetermined refractive index profile of the optical fiber can be selected to influence the wavelength dependency of wavelength dispersion therein, thereby influencing the chromatic dispersion at predetermined wavelength. Influencing wavelength and material dispersion affects combine to yield an overall positive or negative chromatic dispersion characteristic at any given point in a given optical fiber at a given wavelength. Optical performance concerns regarding pulse spreading caused by chromatic dispersion have created a need for dispersion compensating systems. Dispersion compensating systems employing, for example, positive and negative dispersion compensating fibers, are nevertheless subject to the optical performance constraints associated with optical attenuation.

A fiber optic cable design that acknowledges chromatic dispersion affects is described in U.S. Pat. No. 5,611,016. The patent pertains to a dispersion-balanced optical cable for reducing four-photon mixing in wave division multiplexing systems, the cable being designed to reduce cumulative dispersion to near zero. The dispersion-balanced optical cable requires positive and negative dispersion fibers in the same cable. Further, the positive dispersion aspect includes a dispersion characteristic defined as the average of the absolute magnitudes of the dispersions of the positive dispersion fibers exceeding 0.8 ps/(nm·km) at a source wavelength. In addition, the negative dispersion fiber characteristic requires the average of the absolute magnitudes of the dispersions of the negative dispersion fibers to exceed 0.8 ps/(nm·km) at the source wavelength. The aforementioned optical fibers are ribbonized, single-mode fibers designed for the transmission of optical signals in the 1550 nm wavelength region. The fibers are non-stranded or non-helically enclosed within a mono-tube cable, and are described as having an attenuation at 1550 nm of 0.22–0.25 dB/km, and attenuation at 1310 nm of <0.50 dB/km. At defined parameters, the positive-dispersion characteristic is described as being +2.3 ps/(nm·km) and the negative-dispersion characteristic is described as being −1.6 ps/(nm·km).

Other patents describe optical performance characteristics relating to a time division, rather than wave division, system. For example, U.S. Pat. No. 4,478,488 describes selective time compression and time delay of optical signals, without discussing the problems associated with attenuation or chromatic dispersion. A system is described using discrete channels having a dispersive section coupled to a standard multi-waveguide transmission section, and then another dispersive section. Signals are intended to propagate spatially out of phase, which can minimize channel coupling phenomena. An embodiment requires respective plastic coatings formed on twisted optical fibers, the coatings having varying diameters for varying the helix of the fibers in the cable. Individual fibers are spaced from the axis of the twist by different respective distances. This causes some fibers to twist more than others and extends the length of fiber located at the outside of the bundle, and the propagation times thereof, compared to one nearer the inside of the bundle. Using a multicore cable made up of cores embedded in a single cladding, each fiber is fixed at a helix that is different than the helix of any other fiber.

ASPECTS OF THE INVENTION

The present invention is directed to a fiber optic cable including a plurality of carriers respectively having at least one optical fiber therein, the carriers defining at least two layers generally disposed about a center area of the cable, the layers defining a relatively inner layer of carriers being closer to the center area, and an outer layer of carriers being relatively further from the center area, the inner and outer carrier layers each having a respective helix-plus-EFL value, a difference between the respective helix-plus-EFL values of the layers defining a differential range, the differential range being about 1% or less.

The present invention is also directed to a fiber optic cable system including first and second fiber optic cables, each of the first and second fiber optic cables having respective optical fibers disposed in carriers, the carriers defining at least two layers respectively in the fiber optic cables generally disposed about a center area of the respective fiber optic cables, the carrier layers defining a relatively inner layer of carriers being closer to the center area, and an outer layer of carriers being relatively further from the center area, the inner and outer carrier layers each having a respective helix-plus-EFL value, a difference between the respective helix-plus-EFL values of the layers in the fiber optic cables defining a differential range, the differential range being about 1% or less, and at least one optical fiber of the first fiber optic cable being optically connected to at least one optical fiber of the second fiber optic cable.

The present invention is further directed to a fiber optic cable system including first and second fiber optic cables, each of the first and second fiber optic cables having respective optical fibers disposed in carriers, the carriers generally arranged in at least one layer respectively in the cables and are generally disposed about a center area of the respective fiber optic cables, the first fiber optic cable having a different number of layers than the second fiber optic cable, the carrier layers of the fiber optic cables having a respective helix-plus-EFL value, a difference between the respective helix-plus-EFL values of the layers of at least one the fiber optic cables defining a differential range, the differential range being about 1% or less, and at least one optical fiber of the first fiber optic cable being optically connected to at least one optical fiber of the second fiber optic cable.

The present invention is still further directed to a method of manufacturing a fiber optic cable including selecting a predetermined helix and an excess fiber length (EFL) value for respective layers of carriers of the fiber optic cable, wherein the predetermined helix and EFL values are added together to calculate a respective helix-plus-EFL value for the respective layers of carriers, and maintaining the helix and EFL values for the respective layers of carriers so that a difference between respective helix-plus-EFL values of the respective layers is about 1% or less.

BRIEF DESCRIPTION OF THE DRAWING FIGURE

FIG. 3 depicts contours for the layer of inner tubes of the fiber optic cable of FIG. 1 overlaid on an exemplary graph of load versus minimum temperature according to the present inventions.

DETAILED DESCRIPTION OF THE INVENTION

Figure 1:
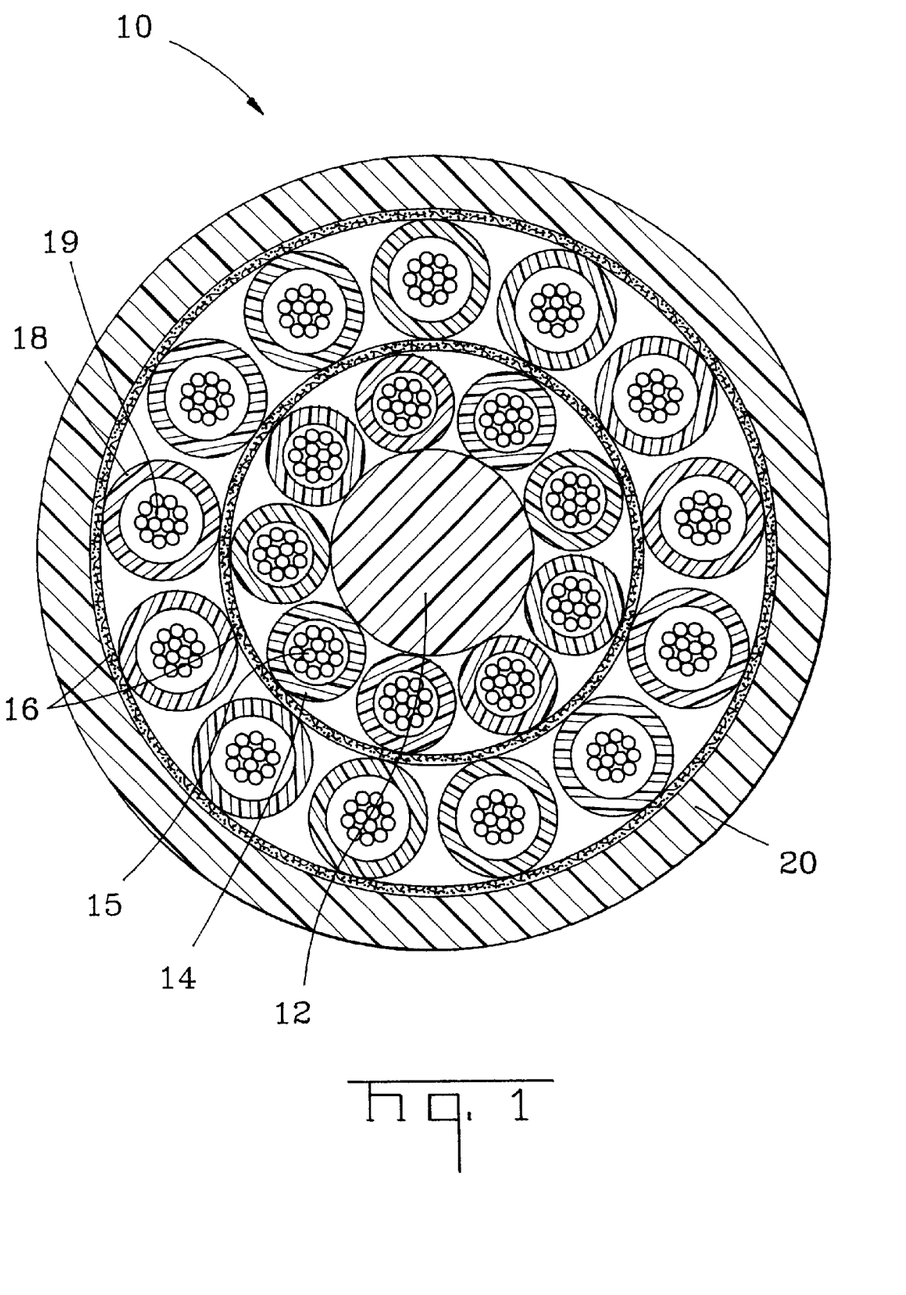
FIG. 1 is a cross sectional view of an exemplary fiber optic cable according to the present inventions.
Figure 5:
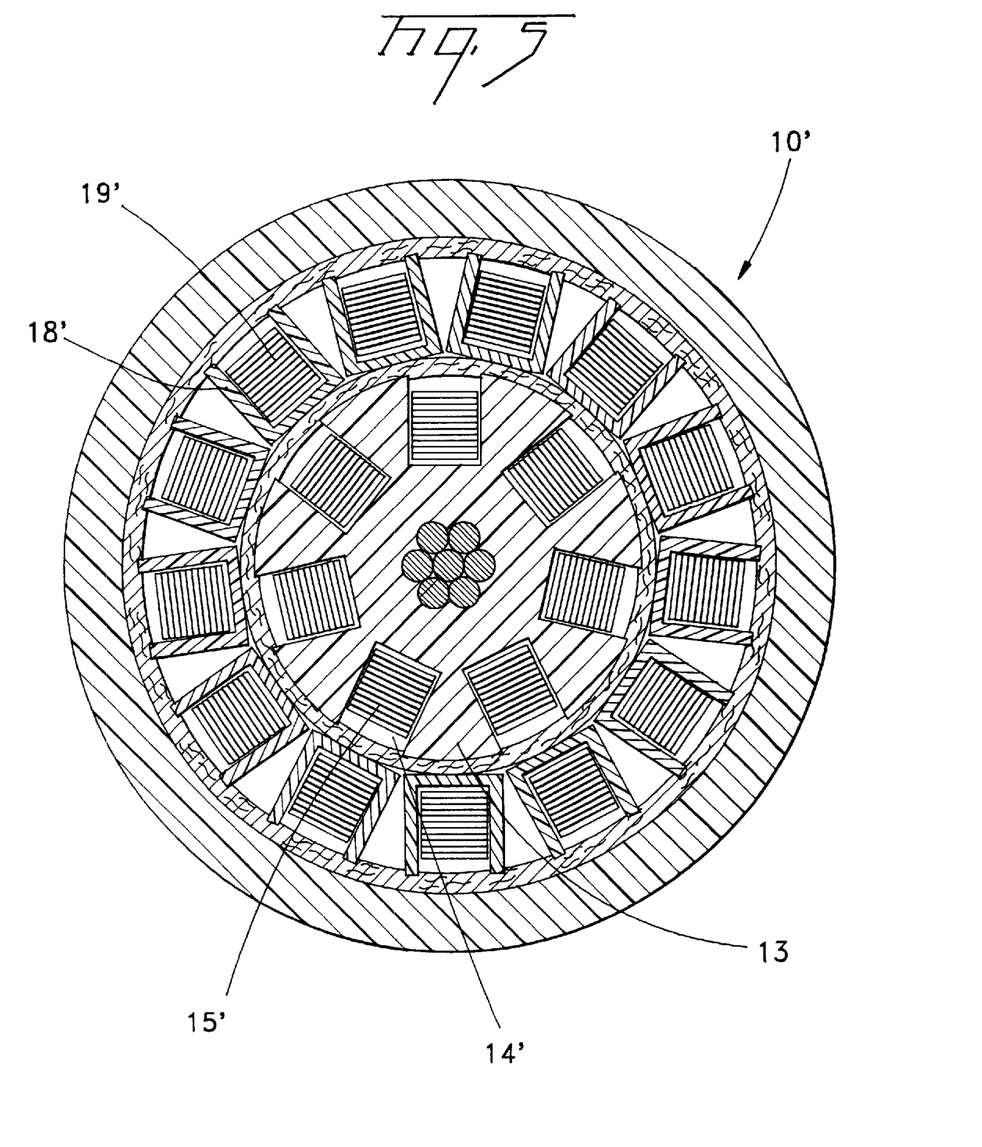
FIG. 5 is a cross sectional view of an exemplary fiber optic cable according to another embodiment of the present inventions.
Figure 7:
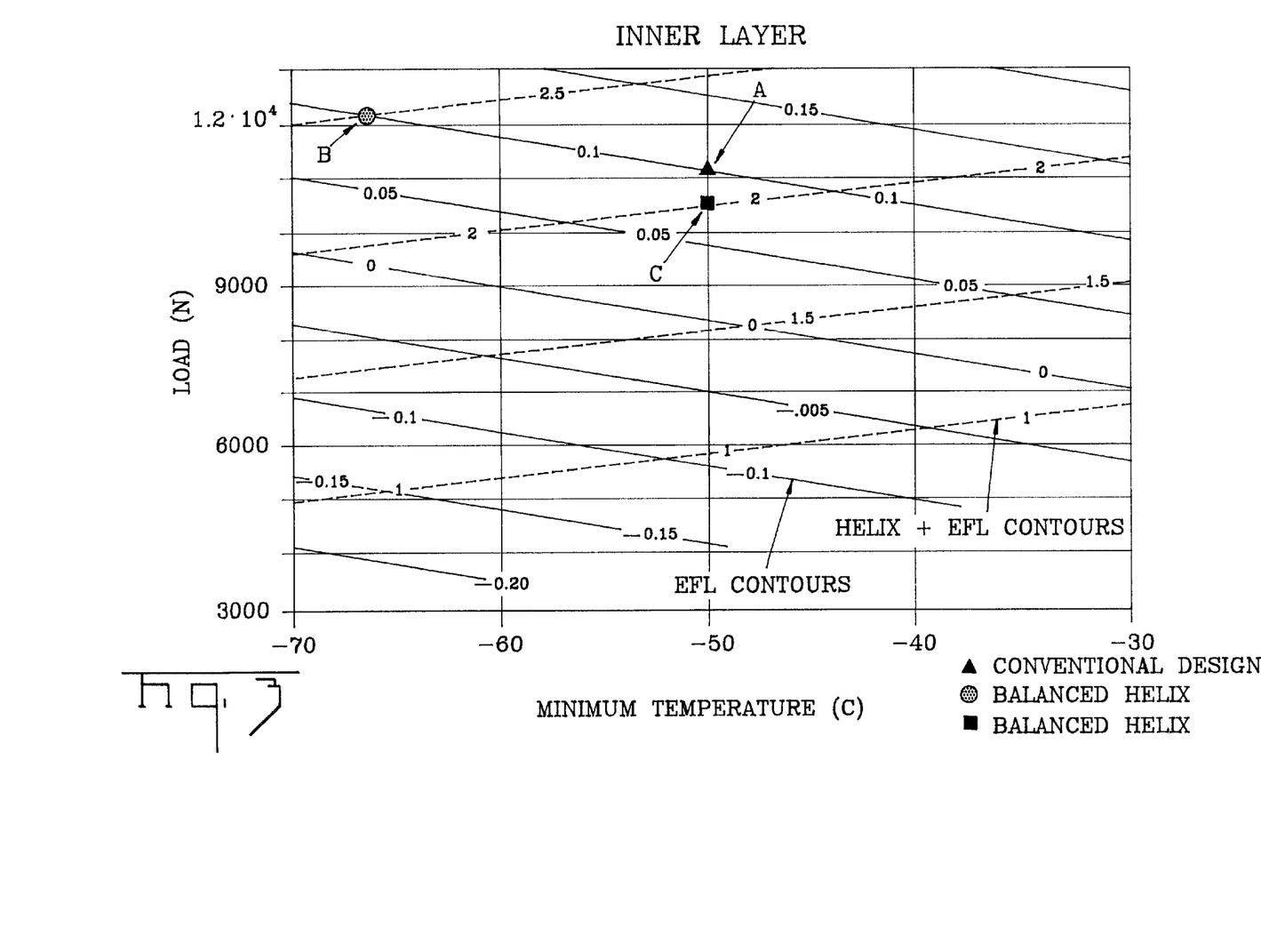

Referring to FIG. 1, an exemplary fiber optic cable 10 is shown and described for use in an optical transmission system, for example, a dispersion managed cable system (DMCS). Fiber optic cables according to the present inventions can be of a loose tube construction and can include a single, silica-based optical fiber type or they can define a hybrid design containing at least two different optical fiber types. For example, the cables can include both positive and negative dispersion-compensating fibers (DMCS fibers) or a single type of dispersion managed fiber in combination with non-DMCS fibers, for example, LEAF®, SMF-28, or METROCOR™ fibers made available by Corning Incorporated. However, other suitable cable constructions can employ the concepts of the present inventions, for example, instead of tubes acting as the optical fiber carrier, other suitable carriers may be used to route the optical fibers within the cable. For example, carriers may also include U-shaped carriers, slots of a slotted core, other suitable carriers, or combinations thereof for routing the optical fibers within the cable (FIG. 5).

DMCS optical fibers used in cables according to the present inventions have predetermined attenuation and chromatic dispersion characteristics such that, in the 1500–1600 nm wavelength regime, the range of absolute values of the chromatic dispersion is between about ten to about forty ps/(nm·km). For example, the positive dispersion optical fibers have a dispersion of about ten to thirty ps/(nm·km), and the negative dispersion optical fibers have a dispersion of about negative twenty to about negative forty ps/(nm·km).

A DMCS fiber is nevertheless subject to optical performance constraints associated with, for example, optical attenuation. The inventors of the present inventions have recognized that optical attenuation and the magnitude of the local chromatic dispersion are both directly proportional to a helix value and/or an excess fiber length (EFL). The inventors of the present inventions have furthermore discovered a way of managing factors that reduce variations in optical performance, e.g., optical attenuation, in a way that enhances chromatic dispersion management systems. While the magnitudes of optical parameters are of major interest in maximizing the reach of a system, the reduction in variation in parameters also allows a greater reach. One factor currently being used to define a digital system quality is the Q factor which is effectively the ratio of the difference between the received "1" and "0" power levels divided by the sum of the standard deviations of the "1" and "0" levels. An increased Q (good) is associated with more power going through (Low attenuation) and consistencies of the power (low variation) in attenuation and chromatic dispersion. If dispersion is not fully compensated the variation in the "1"s and "0"s increase.

In accordance with the concepts of the present inventions, fiber optic cables having multiple layers of optical fibers, in suitable cable constructions, have controlled helix values and strain windows for controlling optical attenuation and dispersion, enhancing dispersion management and resulting in acceptable Q factors. Additionally, the concepts of the present inventions can be practiced with suitable fiber optic cables having a single layer.

Features of the present inventions are the minimization of the absolute optical fiber length in the cable, with control of the relative optical fiber length in and/or between layers in single or multi-layer optical fiber stranded cables while maintaining desired cable dimensional, thermal, and tensile performance criteria. The present inventions achieve a balance of controlling the helix value, tensile and compressive strain windows, the strength elements in the cable, the EFL, and/or the composite thermal expansion characteristics of the cable.

To manufacture multi-layer cables according to the present inventions, cable design parameters such as helix and/or EFL values are controlled and/or minimized. According to the present inventive concepts, several exemplary equations are disclosed. As used herein helix value means the carrier overlength, in any suitable configuration, with respect to the longitudinal length of the cable and is commonly expressed as a percent. For example, the lay length and the pitch diameter of an individual carrier determine the helix value of that carrier. Additionally, as used herein EFL value means the length of the optical fiber(s), for example, optical fiber bundles or ribbons, that exceeds the length of the carrier that contains the same and is generally expressed as a percent. Equation 1 shows the relationship between the helix value, the lay length and the pitch diameter for a unidirectional helix:

$$H_i = \sqrt{1 + \frac{\pi^2 P_i^2}{L_i^2}} - 1 \quad (1)$$

Where $H_i$=the helix value for carrier i;
$P_i$=the pitch diameter for carrier i; and
$L_i$=the lay length for carrier i.

Additionally, the concepts of the present inventions can be practiced with fiber optic cables having carriers with other suitable configurations other than a unidirectional helix. For example, S-Z stranding; however, with these other suitable configurations other suitable equations and/or approximations for the helix value are generally required as known to the skilled artisan. Moreover, the skilled artisan would understand that, for example, S-Z stranding has a reversing lay that varies over the length of the cable, but has a definable helix value because of the carrier overlength.

The nominal radius of curvature of an optical fiber or optical fiber bundle in the center of a given buffer tube is determined by the lay length of the buffer tube, diameter of core or core components around which the tube is stranded, and diameter of the tube. Equation 2 shows the relationship among the nominal radius of curvature of an optical fiber or optical fiber bundle in the center of a given buffer tube of a straight laid cable, the lay length, diameter of core or core components, and diameter of the tube.

$$R_j = \frac{L_j^2 + \pi^2 (D_j + d_j)^2}{2\pi^2 (D_j + d_j)} \quad (2)$$

Where $R_j$=nominal radius of curvature of an optical fiber, or fiber bundle, in the center of a buffer tube,
$L_j$=lay length of buffer tube j,
$D_j$=the diameter of the core or core components around which the tubes are stranded, and
$d_j$=the outer diameter of the buffer tube.

The tensile strain window for stranded loose tube cables can be defined as the percent axial elongation the cable can experience before the fibers experience fiber strain. Equation 3 shows a method for estimating the strain window for fibers in a given buffer tube for use in the present inventions.

$$M_{ej} = \sqrt{1 + \frac{\pi^2}{L_j^2}[(D_j + d_j + \Delta_j)^2 - (D_j + 2t_j + b_j)^2]} - 1 \quad (3)$$

Where $M_{ej}$=tensile strain window,
$\Delta_j$=the increase in pitch diameter caused by fiber excess length in buffer tube j,
$t_j$=the thickness of the tube wall for buffer tube j, and
$b_j$=the effective diameter of the fiber or fiber bundle in buffer tube j.

The cable tensile strain window $M_e$ is the minimum buffer tube tensile strain window and is also normally expressed as a percent and the rest of the parameters are as defined for Equation 2.

The compressive strain window for stranded loose tube cables is commonly defined as the percent axial compression the cable can withstand before fiber compression occurs. Equation 4 shows a method for estimating the compressive strain window for buffer tube j.

$$M_{cj} = \sqrt{1 + \frac{\pi^2}{L_j^2}[(D_j + d_j + \Delta_j)^2 - (D_j + 2d_j - 2t_j - b_j)^2]} - 1 \quad (4)$$

Where $M_{cj}$ equals the compressive strain window and the rest of the parameters are as defined for Equation 3. The compressive strain window $M_c$ is the $M_{cj}$ with the minimum absolute value and is normally expressed as a percent.

The composite thermal coefficient of a cable can be estimated by Equation 5:

$$\alpha_c = \frac{\sum_{i=1 \text{ to } N}^{n} E_i A_i \alpha_i}{\sum_{i=1 \text{ to } N}^{n} E_i A_i} \quad (5)$$

Where $\alpha_c$=the composite thermal expansion coefficient,
$\alpha_i$=the Thermal Coefficient of expansion for material i,
$E_i$=the Young's modulus of material i,
$A_i$=the cross sectional area of material I, and
N=the number of materials under stress in the cable.

The allowable temperature limits can be found from Equations 6 and 7.

$$T_{\max} = \frac{(M_e + S_a)}{\alpha} + T_{nom} \quad (6)$$

Where $T_{max}$=maximum temperature for design purposes;
$M_e$=cable tensile strain window;
$S_a$=allowable fiber strain;
$\alpha$=composite thermal coefficient; and
$T_{Nom}$=the nominal design temperature for cable characteristic calculations.

$$T_{\min} = \frac{(M_c + C_a)}{\alpha} + T_{Nom} \quad (7)$$

Where $T_{min}$=minimum temperature for design purposes;
$M_c$=cable compressive strain window;
$C_a$=allowable fiber compression;
$\alpha$=composite thermal coefficient; and
$T_{Nom}$=the nominal design temperature for cable characteristic calculations.

Strain window is a property of the cable geometry that limits the strain that fibers experience when the cable is stretched, through the application of an external force, or when it contracts or expands in response to thermal affects. Exceeding the strain window can disadvantageously cause optical attenuation and polarization mode dispersion (PMD). In accordance with the present inventive concepts, the respective helix values, and/or EFL values for respective layers of buffer tubes in the cable, are controlled. The layers of tubes are generally concentric with respect to a center of the cable, and tubes of a given layer are spaced from the center of the cable to the center of the carrier at about the same distance. For example, the helix value(s) for at least two layers of buffer tubes can be made substantially the same, for example; the respective helix values of the inner and outer layers being about 2%, and about 2–3%. Other embodiments may include controlled, non-equal helix values for each layer, for example, respective helix values of the inner and outer layers being 0.5%, and about 3–4%.

However, other suitable helix values using the concepts of the present invention can be used for balanced or non-balanced configurations.

FIG. 1 depicts fiber optic cable 10, an exemplary embodiment of a cable made in accordance with the present inventive concepts. Fiber optic cable 10 preferably includes at least two layers of buffer tubes 14,18, at least some of the buffer tubes contain loose-bundled and/or thread bundled optical fibers 15,19 defining a respective bundle diameter. Tubes 14 comprise an inner layer of buffer tubes, and tubes 18 comprise an outer layer of buffer tubes. The buffer tubes are formed of materials with known and/or measurable temperature coefficients of expansion/contraction. As noted above, the optical fibers in the tubes can be positive and/or negative dispersion compensating, and can include non-dispersion shifted optical fibers, for example, LEAF®, SMF-28 optical fibers, and/or METROCOR™ fibers made available by Corning Incorporated. A filler rod (not shown) can occupy one or more tube positions. Tubes 14,18 are preferably stranded about the center of the cable, which is preferably occupied by a central strength member 12. Water swellable tapes 16 can be disposed adjacent the buffer tubes. A surrounding cable jacket 20 formed of, for example, polyethylene, is extruded over the components.

In preferred embodiments the buffer tube outer diameters (OD) vary from tube layer to tube layer, but the outer diameters will preferably be generally the same within a given layer. Preferably, the tube layers having relatively smaller outer tube diameters occupy the inner tube layer. Also, the number of fibers and fiber types in the tubes could be different between layers or tubes within a layer. Additionally, EFL of the different layers can be controlled as discussed herein. Preferably, all cable components are made within suitable manufacturing specifications, and are of known and/or measurable material, mechanical, or geometrical characteristics. For example, the respective moduli of the components are known, each buffer tube is substantially round and has inner and outer diameters defining a generally constant tube wall thickness, and the buffer tubes are stranded along a lay length or pitch within manufacturing tolerances. Preferably, helix values are controlled from tube layer to tube layer. In one embodiment, cables made according to the present inventions advantageously have essentially the same helix values for at least two layers of buffer tube layers.

In accordance with the present inventive concepts, the compression margin is different for each layer and is a function of, for example, buffer tube dimensions and lay lengths. The thermal limit for fiber optic cables according to the present inventions is preferably determined by the highest desired minimum temperature rating between the at least two layers. In other words, the desired strain window is preferably based on a desired minimum temperature limit. In a preferred embodiment, cable 10 has exemplary minimum temperature limit of −40° C. and a maximum temperature limit of 70° C. with 8–9 buffer tubes on the inner layer, and 12–13 tubes on the outer layer. A cable meeting these temperature requirements can be made with identical 3.0/2.3 mm (OD/ID) tubes, for example, the inner and outer layers having a minimum helix value of about 1.61%. A reduced helix value of about 1.45% can be achieved by using a 3.0/2.3 mm tube in the outer layer and a 2.4/1.7 mm tube in the inner layer. An even lower helix of about 0.96% can be achieved by using a 3.15/2.9 mm tube in the outer layer and a 2.9/2.2 mm tube in the inner layer. The foregoing assumes known or measurable material, mechanical, and geometrical characteristics for use in the equations presented hereinabove. Other constraints on the cable design, such as maximum allowed diameters and weights, typically provide the limiting factor for the cables to be used in a particular system.

Illustratively, a preferred tube outer diameter range is about 1.5 mm to about 8.0 mm with a lay length range of about 60 mm to about 600 mm. In general, the tubes of the inner layer have a different outside diameter and inside diameter than buffer tubes in the at least one other layer. In one example, the inner layer has 2.5/1.8 mm tubes and the outer layer has 3.0/2.3 mm tubes, all with 12 fibers. This enables a lay length such that the cable has a controlled helix value, e.g., essentially the same helix value (percentage) in both layers, and meets both the thermal and tensile rating requirements. This also enables the overall diameter of the cable to be minimized for a given fiber count having at least two layers and essentially balanced helix values.

Fiber optic cables according to the present inventions can be optically interconnected by, for example, fusion splicing, defining a cable system. In one system embodiment, concatenated cables have minimum variation in fiber length without the need to do cross-splicing between inner and outer layers of buffer tubes of the respective cables, thereby minimizing differential fiber length. Layers of buffer tubes having like helix values are interconnected. In other words, the fiber optic cable system has first and second fiber optic cables, each of the first and second fiber optic cables having respective optical fibers disposed in buffer tubes. The buffer tubes defining at least two layers respectively in the cables, and being generally stranded about center areas of the respective fiber optic cables. The buffer tube layers define a relatively inner layer of buffer tubes closer to the center area, and an outer layer of buffer tubes being relatively further from the center area. The inner and outer buffer tube layers each define a respective helix value, which can be substantially the same within each cable; and the layer of buffer tubes of the first optical fiber cable is optically connected to a corresponding layer of buffer tubes of the second fiber optic cable, e.g., by fusion splicing. For example, inner layers can be connected to inner layers from cable to cable in the system.

Other balanced cable systems are possible as well. For example, where the respective helix values within each of the cables are substantially non-equal, and the layer of buffer tubes of the first optical fiber cable are optically connected to a non-corresponding layer of buffer tubes of the second fiber optic cable. For example, an outer layer of buffer tubes of a first cable can be connected to an inner layer of buffer tubes of a second cable, and vice versa. The respective helix values are established as needed for the system requirements. Helix values of the interconnected layers can be substantially the same or non-equal.

Other embodiments of a balanced cable system using the concepts of the present inventions are also possible. For example, a first cable having a single layer of buffer tubes can be optically interconnected with a second cable having more than one layer of buffer tubes. Illustratively, the first cable has a single layer of twelve buffer tubes, each tube having twelve fibers, for a total fiber count of 144 fibers therein. The second cable has two layers with six buffer tubes in the inner layer and twelve buffer tubes in the outer layer, each tube having twelve fibers, for a total fiber count of 216 fibers therein. The fibers of the six tubes of the inner layer of the second cable may be connected to the first six tubes of the first cable, and six tubes of the outer layer of the second cable may be connected to the remaining six tubes of the first cable. Likewise, fiber optic cables having the same or other suitable configurations of layers and/or fiber counts may be optically interconnected in other manners using the concepts of the present inventions. For example, the twelve tubes of the first cable may be optically interconnected to the twelve tubes of the outer layer of the second cable.

The cables and/or systems of the present inventions can be used as a space diversity backup system, for example, where one fiber optic cable is used as a backup for two other fiber optic cables with differing helix values in the same system. To minimize the differences in back up fiber length from the main system fibers, the helix value in each layer of a fiber optic cable according to the present inventions can be made to correspond to the helix values in the cables being backed up.

In other embodiments of the present inventions EFL can be controlled, for example, EFL can either be the same or different between layers, with or without a balanced helix. However, when a generally balanced helix is achieved and the EFL between layers is generally equal, the cable characteristics between layers can be substantially different as explained below. After the cable is manufactured it may be difficult to physically measure EFL; however, EFL may generally be determined by measuring, for example, cable and/or optical fiber characteristics.

Figure 2:
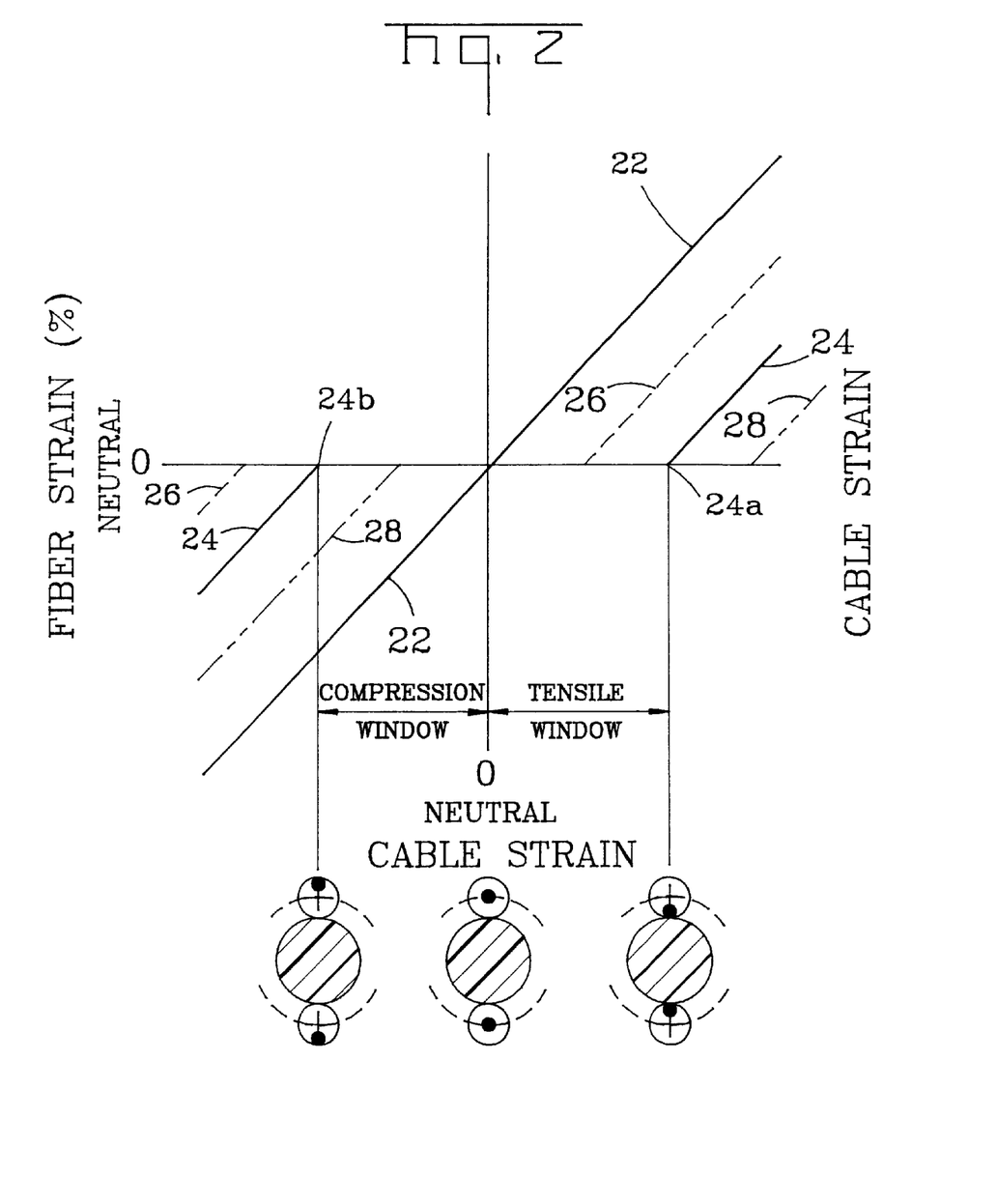
FIG. 2 is an exemplary graph of fiber strain versus cable strain depicting the effect of excess fiber length (EFL) on strain windows.

EFL can be determined and/or approximated by physically measuring buffer tube length and comparing it to optical fiber length, and/or measuring strain windows can approximate EFL. FIG. 2 shows a graph illustrating fiber strain/cable strain versus cable strain. The strain window can be defined as the sum of the compression strain window plus the tensile strain window. A low compression strain window indicates a risk that optical performance can be degraded when the cable is under compression, for example, such a risk is created by low temperature conditions. A low tensile strain window indicates a risk that cable optical performance can be degraded when the cable is under tension. Both windows exist, for example, when the optical fiber is experiencing essentially no strain, a state corresponding to FIG. 2 along a neutral position of 0% fiber strain. A broad overall strain window, along the 0% fiber strain line, is therefore desirable for broad tensile and/or low temperature cable applications.

To illustrate, line 22 is a representative datum indicating cable strain existing in a cable due to tensile or compressive forces acting thereon. Cable strain line 22 traverses the fiber strain neutral position and the cable strain neutral position. Above the fiber strain neutral position, the cable is experiencing tension, and below, compression.

The cross-sectional views schematically depict a portion of fiber optic cable 10 to illustrate the movement of optical fibers within, for example, the inner layer of buffer tubes. More particularly, two tubes 14 positioned on opposite sides of central strength member 12 are depicted, and the other tubes and components are omitted for clarity. As cable strain increases in the cable due to tension, the optical fiber(s) moves to the inside wall of the tube until it touches it causing an inflection point 24a, where the fiber strain will typically increase linearly with cable strain. On the other hand, as cable strain increases due to compression, the optical fiber moves to the outside wall of the tube until it touches it causing an inflection point 24b, where the fiber strain can increase linearly with cable strain, but generally there are non-linearities. It is between the inflection points for a cable design that the fiber strain is essentially zero and optical cable performance is likely to be most satisfactory.

A state of essentially zero EFL is where the tube and optical fiber lengths are essentially equal or balanced.

Length balanced line 24 represents a stranded buffer tube having optical fibers therein where the length of the tube and the length of the optical fiber(s) therein are balanced, i.e., they have essentially the same length, defining an EFL of essentially zero.

By comparison, negative and positive EFL conditions may exist. Negative EFL line 26 indicates a condition where the optical fiber(s) is shorter than the buffer tube, thereby defining a negative EFL condition. In other words, with a negative EFL the cable can undesirably withstand less tensile strain before the optical fiber(s) within the buffer tube experience tensile strain. Whereas, positive EFL line 28 indicates a condition where the optical fiber(s) is longer than the buffer tube, thereby defining a positive EFL condition.

Creating neutral, positive, or negative EFL conditions can affect cable performance. Although the largest tensile strain window exists for the positive EFL condition, cable performance will suffer when the cable is in compression, for example, during low temperature conditions because of the smaller compression strain window as illustrated by positive EFL line 28. Similarly, as illustrated by negative EFL line 26, negative EFL can compensate for low temperature effects; however, a relatively smaller, and possibly undesirable, tensile strain window results.

Other suitable, and preferably more precise, methods of measuring EFL may be used. For example, EFL may be determined using a commercially available high-resolution reflectometer to determine the optical path length. One such high-resolution reflectometer is model AQ7410 available from Ando Electric Co. of Tokyo, Japan.

In accordance with the concepts of the present inventions, it is desirable to improve cable and/or system performance by generally balancing optical fiber path lengths among, for example, layers, bundles, and/or ribbon stacks by using helix and/or EFL values while maintaining satisfactory levels of, for example, thermal and/or optical performance.

Figure 4:
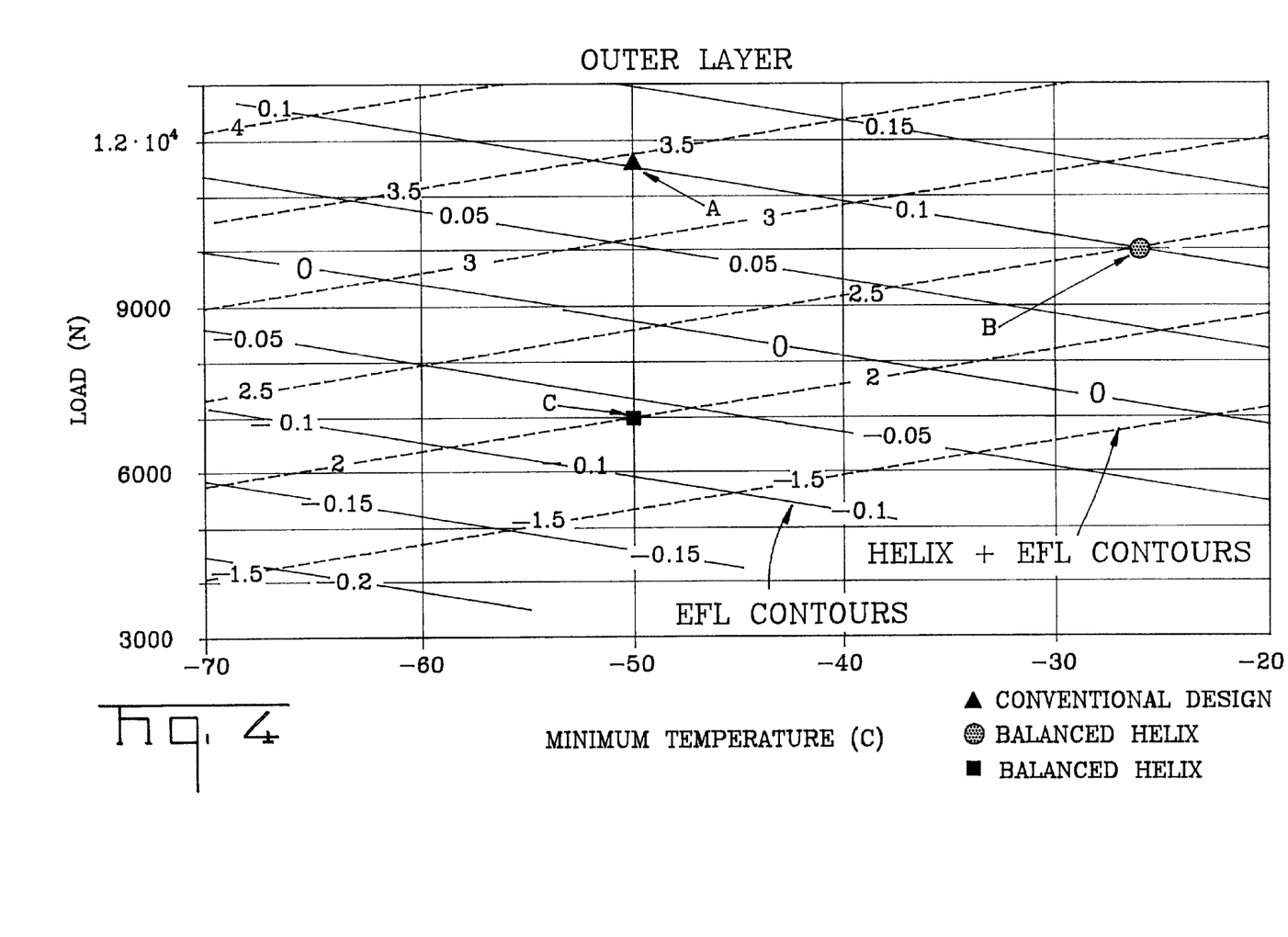
FIG. 4 depicts contours for the layer of outer tubes of the fiber optic cable of FIG. 1 overlaid on an exemplary graph of load versus minimum temperature according to the present inventions.

The skilled artisan understands that the true optical fiber path length with respect to longitudinal length of the fiber optic cable is given by the helix value times the EFL value. However, the arithmetic sum of the helix value and the EFL value is a relatively accurate approximation of the optical fiber path length for suitable ranges. For example, 1.5% helix value combined with a 0.1% EFL value has a true optical path length of about 1.6015% and the helix-plus-EFL value approximates the optical path length at about 1.6%. Illustrative of the inventive concepts, FIGS. 3 and 4 depict EFL contours (solid line diagonals) and helix-plus-EFL contours (dashed line diagonals) overlaid on a graph depicting maximum load versus minimum temperature on the cable. In accordance with the inventive examples of present inventions, the tensile optical fiber strain is limited to a predefined value, namely, about 0.3 percent.

More specifically, the graphs of FIGS. 3 and 4 were generated using the design equations disclosed hereinabove using a commercially available software package. FIG. 3 represents characteristics associated with an inner layer of tubes, for example, buffer tubes 14,15. FIG. 4 represents characteristics associated with an outer layer of tubes, for example, buffer tubes 18,19. However, the concepts may be applied to other suitable cable configurations.

By way of example, a conventional cable design will be described. As shown in FIG. 3, point A represents an inner tube assembly having a minimum temperature of about −50° C. and an EFL of, reading the EFL contour line, about 0.1 percent. Similarly, as shown in FIG. 4, point A represents an outer tube assembly having a minimum temperature of about −50° C. and an EFL of, again reading the EFL contour line, about 0.1 percent. The helix-plus-EFL values for each tube layer represent a more accurate description of optical path length, rather than just the helix value. This is important for length dependent optical performance characteristics such as dispersion and attenuation, and the impact on Q factors. As shown in FIG. 3, interpolating between helix-plus-EFL values, the helix plus-EFL value for the inner tube is roughly about 2.1 percent, while, as shown in FIG. 4, the helix-plus-EFL value for the outer tube is roughly about 3.4 percent. In other words, the helix-plus-EFL values between the layers are not balanced. More particularly, the difference in helix-plus-EFL values between layers is about 1.3 percent. This difference can be significant in DMCS designed to control the length dependent characteristics of attenuation and dispersion. For example, taking helix-plus-EFL values into account in DMCS design can avoid system equipment costs by eliminating the need for repeaters and/or regenerators.

Embodiments of the present inventions include inner and outer buffer tube layers with each layer having a respective helix-plus-EFL value, wherein the helix-plus-EFL values are generally balanced, e.g., substantially the same and/or within a differential range among the layers. Likewise, the carriers and the respective optical fibers therein of a predetermined layer can have a helix-plus-EFL value, wherein the values are generally balanced and/or within a local differential range within the layer. For example, the helix-plus-EFL values between the layers and/or within a layer have a difference of about 1.0 percent or less, more preferably, about 0.5 percent or less, and most preferably about 0.2 percent or less. Carrier layers, for example, tubes having respective helix-plus-EFL values that are balanced may be accomplished with EFL values that are about substantially the same between the layers and/or disposed within the carriers. Substantially the same EFL means the difference between EFL values among optical fibers is about 0.3 percent or less, more preferably, the difference is about 0.2 percent or less, and most preferably, the difference is about 0.1 percent or less. Furthermore, an average EFL value of a given layer can be calculated by adding the EFL values for optical fibers within each carrier of the layer and dividing by the number of carriers. However, other embodiments of the present inventions may include helix-plus-EFL values that are substantially different.

More specifically, embodiments of the present inventions may include a balanced helix and EFL value between the layers with substantially the same EFL in the layers; however, the layers can have, for example, different values for the minimum temperature. To illustrate, as shown in FIG. 3, point B represents an inner tube assembly having a helix-plus-EFL value of about 2.5 percent and an EFL of about 0.1 percent. As shown in FIG. 4, point B represents an outer tube assembly having a helix-plus-EFL value of about 2.5 percent and an EFL of about 0.1 percent. However, the minimum temperatures that the inner tube assembly and the outer tube assembly can accommodate are not the same. More particularly, as shown in FIG. 3, the inner tube assembly can accommodate a minimum temperature of about −65° C., while, as shown in FIG. 4, the outer tube assembly can only accommodate a minimum temperature of about −25° C. The difference in minimum temperatures that the layers can accommodate in this example is about 40° C. Generally, it is preferred, but not necessary, to have layers within a cable rated at or below a predetermined minimum temperature.

Additionally, embodiments of the present inventions may also include a balanced helix-plus-EFL value between the carrier layers, for example, tube-layers with substantially the same EFL values between the layers allowing the layers to generally accommodate about the same minimum temperature. The same minimum temperature means a minimum temperature difference that the layers can accommodate of about 50° C. or less, more preferably, a minimum temperature of about 20° C. or less, and most preferably about 10° C. To illustrate, as shown in FIG. 3, point C represents an inner tube assembly having a helix-plus-EFL value of about 2.0 percent and an EFL of about 0.08 percent. As shown in FIG. 4, point C represents an outer tube assembly having a helix-plus-EFL value of about 2.0 percent and an EFL of about −0.07 percent. Advantageously, the minimum temperature that the inner tube assembly and the outer tube assembly can accommodate is about the same, namely, about −50° C.

In still other embodiments of the present inventions the carriers, such as buffer tubes, can have different numbers of optical fibers. For example, the outer layer of buffer tubes can have a fewer number of optical fibers in a bundle or stack, with respect to the bundle or stack of the inner layer of buffer tubes, while still balancing the helix-plus-EFL values among the layers. However, in other embodiments the inner layer of carriers, such as buffer tubes, can have a fewer number of fiber in a bundle or stack, while still balancing the helix-plus-EFL values among the layers. In yet other embodiments, a cable includes a single layer of optical fiber carriers, for example, buffer tubes with a cable jacket extruded therearound, which is similar to FIG. 1 with the second layer of tubes removed. The single layer cable preferably has a minimized, balanced helix and/or balanced helix-plus-EFL values among the carriers and/or optical fibers of the single layer. Additionally, the single layer cable can include other suitable cable components.

Additionally, cables employing the concepts of helix-plus-EFL values can be optically interconnected by, for example, fusion splicing, to define a cable system. The cables can be optically interconnected as described herein and/or using other suitable configurations.

Methods of manufacturing fiber optic cables according to the present inventions include selecting a predetermined helix value(s) and a predetermined excess fiber length(s) for at least one layer of carriers having optical fibers therein. Additionally, the helix-plus-EFL value for these predetermined values should be maintained so that, for example, the difference between respective helix-plus-EFL values of the first layer of carriers having optical fibers disposed therein has a local differential range being about 1% or less. Moreover, the difference between respective helix-plus-EFL values between layers, for example, can be maintained to have a differential range being about 1% or less. However, other ranges can be maintained according to the concepts of the present inventions.

Furthermore, other suitable cable constructions can use other suitable carriers besides loose tubes for the optical fibers; however, the skilled artisan would understand that different design equations may be required for these other cable configurations. For example, the concepts of the present inventions can be applied to cables having U-shaped carriers and/or slotted-core carriers, rather than loose tube carriers. For example, FIG. 5 depicts fiber optic cable 10' having two layers of carriers 14',18' having stacks of optical fibers 15',19' therein. More specifically, slotted core 13 includes slotted core carriers 14' defining an inner layer of carriers, and U-shaped carriers 18' define an outer layer of carriers.

Moreover, the concepts of the present inventions can be applied to a monotube cable construction having bundles of optical fibers stranded therein. The bundles of optical fibers generally exclude carriers; however, the helix values of the optical fiber bundles can be balanced so that the optical fibers have essentially the same optical path length. Monotube constructions would generally not have a helix-plus-EFL value because the bundles lack carriers. For example, within the monotube an inner layer of bundles are stranded with a predetermined helix and an outer layer of bundles are stranded with a predetermined helix so that the respective helix values between the inner and outer layers are balanced.

The present inventions have thus been described with reference to the foregoing embodiments, and are intended to be illustrative of the inventive concepts disclosed herein rather than limiting. Persons of skill in the art will appreciate that variations and modifications of the foregoing embodiments may be made without departing from the scope of the appended claims. In the exemplary embodiment described, the fiber optic cable can include ripcords 28, tapes, water-blocking components, armor, anti-buckling members, buffer tube filling compounds, core binders, and/or other cable components disclosed in U.S. Pat. Nos. 5,930,431, 5,970,196, or 6,014,487, which are respectively incorporated by reference herein.

Accordingly, what is claimed is:

1. A fiber optic cable, comprising:
a plurality of carriers respectively having at least one optical fiber therein, said carriers defining at least two layers generally disposed about a center area of the cable;
said layers defining a relatively inner layer of carriers being closer to said center area, and an outer layer of carriers being relatively further from said center area,
said inner and outer carrier layers each comprising a respective helix-plus-EFL value, a difference between said respective helix-plus-EFL values of the layers defining a differential range, said differential range being about 1% or less.

2. The fiber optic cable of claim 1, said helix-plus-EFL differential range being about 0.5 percent or less.

3. The fiber optic cable of claim 1, said helix-plus-EFL differential range being about 0.2 percent or less.

4. The fiber optic cable of claim 1, said optical fibers disposed in respective carriers comprising a respective excess fiber length (EFL) value, said optical fibers of said inner and outer layers of carriers having a respective average EFL value, a difference between said respective average EFL values of said layers defining an EFL differential range, said EFL differential range being about 0.3 percent or less.

5. The fiber optic cable of claim 4, said EFL differential range being about 0.2 percent or less.

6. The fiber optic cable of claim 4, said EFL differential range being about 0.1 percent or less.

7. The fiber optic cable of claim 1, said carriers being buffer tubes having inner or outer diameters that vary from tube layer to tube layer.

8. The fiber optic cable of claim 1, said carriers being buffer tubes, said layers having relatively smaller buffer tube wall inner or outer diameters occupying the inner tube layer.

9. The fiber optic cable of claim 1, said optical fibers disposed in said layers having a respective average excess fiber length (EFL) value, said average EFL values of said layers being different.

10. The fiber optic cable of claim 1, said optical fibers of said inner layer of carriers having a positive average excess fiber length (EFL) value and said optical fibers of said outer layer of carriers having a negative average EFL value.

11. The fiber optic cable of claim 1, said layers being able to accommodate a respective minimum temperature, a difference between said respective minimum temperatures between said layers being about 50° C. or less.

12. The fiber optic cable of claim 1, said layers being able to accommodate a respective minimum temperature, a difference between said respective minimum temperatures between said layers being about 20° C. or less.

13. The fiber optic cable of claim 1, being a portion of a fiber optic cable system.

14. The fiber optic cable of claim 1, at least one of said carriers being a U-shaped carrier.

15. The fiber optic cable of claim 1, at least one of said carriers being a slot.

16. A fiber optic cable system, comprising:
first and second fiber optic cables, each of said first and second fiber optic cables having respective optical fibers disposed in carriers, said carriers defining at least two layers respectively in said fiber optic cables generally disposed about a center area of the respective fiber optic cables; said carrier layers defining a relatively inner layer of carriers being closer to said center area, and an outer layer of carriers being relatively further from said center area, said inner and outer carrier layers each comprising a respective helix-plus-EFL value, a difference between said respective helix-plus-EFL values of the layers in said fiber optic cables defining a differential range, said differential range being about 1% or less; and at least one optical fiber of said first fiber optic cable being optically connected to at least one optical fiber of said second fiber optic cable.

17. The fiber optic cable system of claim 16, said helix-plus-EFL differential range of at least one of said fiber optic cables being about 0.5 percent or less.

18. The fiber optic cable system of claim 16, said helix-plus-EFL differential range of at least one of said fiber optic cables being about 0.2 percent or less.

19. The fiber optic cable system of claim 16, said respective optical fibers of said inner and outer layers of carriers of at least one of said fiber optic cables having respective average EEL values, a difference between said respective average EFL values defining a EFL differential range, said EFL differential range being about 0.3 percent or less.

20. The fiber optic cable system of claim 19, said EFL differential range being about 0.2 percent or less.

21. The fiber optic cable system of claim 19, said EFL differential range being about 0.1 percent or less.

22. The fiber optic cable system of claim 16, said at least one optical fiber of said first fiber optic cable being optically connected to at least one optical fiber in a same respective layer of said second fiber optic cable.

23. The fiber optic cable system of claim 16, said at least one optical fiber of said first fiber optic cable being optically connected to at least one optical fiber in a different respective layer of said second fiber optic cable.

24. A fiber optic cable system, comprising:
first and second fiber optic cables, each of said first and second fiber optic cables having respective optical fibers disposed in carriers, said carriers generally arranged in at least one layer respectively in said cables and are generally disposed about a center area of the respective fiber optic cables; said first fiber optic cable having a different number of layers than said second fiber optic cable; said carrier layers of said fiber optic cables comprising a respective helix-plus-EFL value, a difference between said respective helix-plus-EFL values of the layers of at least one said fiber optic cables defining a differential range, said differential range being about 1% or less; and at least one optical fiber of said first fiber optic cable being optically connected to at least one optical fiber of said second fiber optic cable.

25. The fiber optic cable system of claim 24, said helix-plus-EFL differential range of at least one of said fiber optic cables being about 0.5 percent or less.

26. The fiber optic cable system of claim 24, said helix-plus-EFL differential range of at least one of said fiber optic cables being about 0.2 percent or less.

27. The fiber optic cable system of claim 24, said optical fibers disposed in respective carriers of at least one of said fiber optic cables comprising a respective excess fiber length (EFL) value, said layers of said at least one fiber optic cable having respective average EFL values, a difference between said respective average EFL values defining an EFL differential range, said EFL differential range being about 0.3 percent or less.

28. The fiber optic cable system of claim 27, said EFL differential range being about 0.2 percent or less.

29. The fiber optic cable system of claim 27, said EFL differential range being about 0.1 percent or less.

30. The fiber optic cable system of claim 24, said at least one optical fiber of said first fiber optic cable being optically connected to at least one optical fiber in a same respective layer of said second fiber optic cable.

31. The fiber optic cable system of claim 24, said at least one optical fiber of said first fiber optic cable being optically connected to at least one optical fiber in a different respective layer of said second fiber optic cable.

32. A method of manufacturing a fiber optic cable, comprising:

selecting a predetermined helix and an excess fiber length (EFL) value for respective layers of carriers of said fiber optic cable, wherein said predetermined helix and EFL values are added together to calculate a respective helix-plus-EFL value for said respective layers of carriers; and maintaining said helix and EFL values for the respective layers of carriers so that a difference between respective helix-plus-EFL values of said respective layers is about 1% or less.

33. The method of claim 32, said step of maintaining further comprising said difference between respective helix-plus-EFL values of said respective layers being about 0.5 percent or less.

34. The method of claim 32, said step of maintaining further comprising said difference between respective helix-plus-EFL values of said respective layers being about 0.2 percent or less.

35. The method of claim 32, said step of selecting respective EFL values further comprising selecting EFL values for respective layers within about 0.3 percent or less.

36. The method of claim 32, said step of selecting respective EFL values further comprising selecting EFL values for respective layers within about 0.2 percent or less.

37. The method of claim 32, said step of selecting respective EFL values further comprising selecting EFL values for respective layers within about 0.1 percent or less.

38. The method of claim 32, said step of selecting respective EFL values further comprising selecting a negative EFL value for at least one of said respective layers.

39. The method of claim 32, said step of selecting further comprising selecting helix-plus-EFL values to accommodate a respective minimum temperature, a difference between said minimum temperatures for the respective layers being about 50° C. or less.

40. The method of claim 32, said step of selecting further comprising selecting helix-plus-EFL values to accommodate a respective minimum temperature, a difference between said minimum temperatures for the respective layers being about 20° C. or less.

* * * * *

UNITED STATES PATENT AND TRADEMARK OFFICE
CERTIFICATE OF CORRECTION

PATENT NO.    : 6,621,965 B2
DATED         : September 16, 2003
INVENTOR(S)   : David A. Seddon and William S. Jackman It is certified that error appears in the above-identified patent and that said Letters Patent is hereby corrected as shown below:

<u>Column 14,</u>
Line 39, delete "EEL" and insert -- EFL --

Signed and Sealed this

Sixteenth Day of December, 2003

JAMES E. ROGAN
*Director of the United States Patent and Trademark Office*